United States Patent
Goncharov et al.

(10) Patent No.: US 11,913,093 B2
(45) Date of Patent: Feb. 27, 2024

(54) HIGH GAMMA PRIME NICKEL BASED WELDING MATERIAL

(71) Applicant: Liburdi Engineering Limited, Dundas (CA)

(72) Inventors: Alexander B. Goncharov, Mississauga (CA); Paul Lowden, Dundas (CA)

(*) Notice: Subject to any disclaimer, the term of this patent is extended or adjusted under 35 U.S.C. 154(b) by 0 days.

(21) Appl. No.: 17/862,128

(22) Filed: Jul. 11, 2022

(65) Prior Publication Data

US 2024/0011127 A1    Jan. 11, 2024

(51) Int. Cl.
| | |
|---|---|
| C22C 19/05 | (2006.01) |
| B23K 9/167 | (2006.01) |
| B23K 35/30 | (2006.01) |
| C22C 16/00 | (2006.01) |
| C22C 19/07 | (2006.01) |
| C22C 21/00 | (2006.01) |
| C22C 27/02 | (2006.01) |
| B23K 101/00 | (2006.01) |
| B33Y 70/00 | (2020.01) |
| B33Y 80/00 | (2015.01) |

(52) U.S. Cl.
CPC ............ C22C 19/056 (2013.01); B23K 9/167 (2013.01); B23K 35/304 (2013.01); C22C 16/00 (2013.01); C22C 19/07 (2013.01); C22C 21/00 (2013.01); C22C 27/02 (2013.01); B23K 2101/001 (2018.08); B33Y 70/00 (2014.12); B33Y 80/00 (2014.12)

(58) Field of Classification Search
CPC ................................. C22F 1/10; C22C 19/056
See application file for complete search history.

(56) References Cited

U.S. PATENT DOCUMENTS

2014/0205449 A1* 7/2014 Mourer ................ C22F 1/10
                                                                   420/588

OTHER PUBLICATIONS

Heckl, A., R. Rettig, and R.F. Singer. "Solidification characteristics and segregation behavior of nickel-base superalloys in dependence on differet rhenium and ruthenium contents." Metallurgical and Materials Transactions A 41.1 (2010): 202.*
A. Gontcharov et al. "Advanced Welding Materials and Technologies for Repair of Turbine Engine Components Manufactured of High Gamma Prime Nickel Based Superalloys." Proceedings of the ASME Turbo Expo 2018: Turbomachinery Technical Conference and Exposition. vol. 6: Ceramics; Controls, Diagnostics, and Instrumentation; Education; Manufacturing Materials and Metallurgy. Oslo, Norway. Jun. 11-15, 2018. V006T24A013. ASME. https://doi.org/10.1115/GT2018-75862.
K. Harris et al. (1990). Directionally solidified and single-crystal superalloys. Metals Handbook. 1.
Mattheu J. Donachie et al. (2003) Superalloys: A Technical Guide. Second Edition , 6. https://doi.org/10.31399/asm.tb.stg2.9781627082679.
High Temperature High Strength Nickel Base Alloys 393 Including 1995 Supplement. https://www.scribd.com/document/491557966/High-TemperatureHigh-StrengthNickel-BaseAlloys-393.
Barhanko, DA, Aberg, NR, & Andersson, OH. "Development of Blade Tip Repair for SGT-700 Turbine Blade Stage 1, With Oxidation Resistant Weld Alloy." Proceedings of the ASME Turbo Expo 2018: Turbomachinery Technical Conference and Exposition. vol. 6: Ceramics; Controls, Diagnostics, and Instrumentation; Education; Manufacturing Materials and Metallurgy. Oslo, Norway. Jun. 11-15, 2018. V006T24A012. ASME. https://doi.org/10.1115/GT2018-75696.
Ross, Earl Warren and Kevin Swayne O'Hara. "Rene' 142: A High Strength, Oxidation Resistant DS Turbine Airfoil Alloy." Superalloys (1992): 257-265.

* cited by examiner

*Primary Examiner* — Jessee R Roe
(74) *Attorney, Agent, or Firm* — Smart & Biggar LP

(57) ABSTRACT

High gamma prime nickel based welding materials comprising (all in wt. %) from 13.0 to 14.0% Cr, from 30.0 to 32.0% Co, from 0.7 to 0.9% Mo, from 7.0 to 8.0% W, from 0.5 to 6.0% Ta, from 3.8 to 5.5 Al %, up to 0.12% Ti, up to 0.02 Zr %, from 0.4 to 0.8% Hf, up to 0.02% B, from 0.05 to 0.3% C, up to 0.015% Y, up to 0.015% V, from 1.0 to 2.0% Re, and nickel to balance for repair of turbine engine components and other articles manufactured from single crystal materials and other superalloys by manual and automatic gas tungsten arc, plasma arc, laser, and electron beam welding as well as for 3D additive manufacturing.

16 Claims, 6 Drawing Sheets

HIGH GAMMA PRIME NICKEL BASED WELDING MATERIAL

FIELD

The specification relates to high gamma prime (γ') nickel based welding material.

BACKGROUND

Most high pressure turbine blades and nozzle guide vanes (NGV) of novel aero and industrial gas turbine (IGT) engines are manufactured from nickel based high gamma-prime (γ') superalloys that have unique combination of oxidation and creep properties. However, despite remarkable properties of high γ' superalloys, engine components frequently require various weld repairs due to creep and thermo-mechanical fatigue cracking, oxidation and hot corrosion damage occurring during operation of turbine engines.

Nickel based René 142 (R142) and René 80 (R80) welding materials have been used for a repair of high (HPT) and low (LPT) pressure turbine blades from 1980's (A. Gontcharov et al, GT2018-75862, "Advanced Welding Materials and Technologies for Repair of Turbine Engine Components manufactured of High Gamma Prime Nickel Based Superalloys", Proceedings of ASME Turbo Expo 2018: Turbine Technical Conference and Exposition, GT2018, Jun. 11-15, 2018, Oslo, Norway (further GT2018-75862)) (incorporated herein by reference).

René 142 welding material, as per U.S. Pat. No. 4,169,742 (incorporated herein by reference), contains (in wt. %): 10-13% Co, 3-10% Cr, 0.5-2.0% Mo, 3-7% W, 0.5-10% Re, 5-6% Al, 5-7% Ta, 0.5-2.0% Hf, 0.01-0.15% C, 0.005-0.05% B, 0-0.1% Zr, with nickel to balance, has excellent creep properties, but extremely poor weldability. Nickel based René 80 with the chemical composition as per U.S. Pat. No. 3,615,376 (incorporated herein by reference), contains Ni-15% Cr-9.5% Co-5% Ti-4% W-4% Mo-3% Al-0.17% C, has better ductility then René 142 but still required preheating of turbine engine components for a repair to high temperature as it was demonstrated by Dikran A. Barhanko et al, "Development of Blade Tip Repair for SGT-700 Turbine Blade Stage 1, With Oxidation Resistant Weld Alloy", Proceedings of ASME Turbo Expo 2018, Turbomachinery Technical Conference and Exposition, GT2018, Jun. 11-15, 2018, Oslo, Norway, (incorporated herein by reference), to produce crack free welds. Preheating of turbine engine components to high temperature significantly increases the cost of repair, reduces productivity, and complicates automatization and robotization of weld repair technology and equipment.

The welding material as per the U.S. Pat. No. 11,180,840 (incorporated herein by reference) contains (in wt. %): 9.0-10.5% Cr, 20-22% Co, 1.0-1.4% Mo, 5.0-5.8% W, 2.0-6.0% Ta, 3.0-6.5% Al, 0.2-0.5% Hf, 0.01-0.016% C, 1.5-3.5% Re, 0-1.0% Ge, 0-0.2% Y, 0-1.0% Si, 0-0.015% B and nickel to balance, is ductile and can produce crack free welds at ambient temperature (without preheating) and weld overlay on most commercially available single crystal materials. However, it was uncovered from experiments that weld buildup, produced using manual gas tungsten arc welding (GTAW-MA) onto the single crystal materials PWA1484, CMSX10, René N6, and others single crystal materials with tantalum (Ta) content exceeding of 6 wt. % are prone to cracking along the interface, due to dilution and non-uniform melting of the single crystal materials as shown in FIG. 1a. Chemical composition of the single crystal materials above and the nickel based superalloys as per U.S. Pat. No. 11,180,840 (US '840) (incorporated herein by reference) are provided in Table 1.

TABLE 1

Typical Chemical Composition of Single Crystal and Some Welding Materials in wt. % with Nickel to Balance

| Mat. | Cr | Co | Mo | W | Ta | Al | Hf | Re | Ti | C | Zr | B | Si | Other | Ref |
|---|---|---|---|---|---|---|---|---|---|---|---|---|---|---|---|
| Rene N5 | 7 | 7.5 | 1.5 | 6 | 4.8 | 6.2 | 0.16 | 3 | — | ≤0.05 | — | 0.004 | — | — | 1 |
| Rene N6 | 4.2 | 12.5 | 1.4 | 6 | 7.2 | 5.8 | 0.15 | 3 | — | ≤0.1 | — | — | — | — | 2 |
| CMSX-10 | 2 | 3 | 4 | 5 | 8 | 5.7 | 0.1 | 3 | — | ≤0.1 | — | — | — | — | 2 |
| PAW1484 | 5 | 10 | 1.9 | 5.9 | 8.7 | 5.6 | 0.03 | 3 | — | ≤0.1 | — | — | — | — | 1 |
| PW1480 | 10 | 5 | — | 4 | 12 | 3.7 | — | — | 1.5 | ≤0.1 | — | — | — | 0.5Nb | 3 |
| R142 | 6.8 | 12 | 1.5 | 4.9 | 6.4 | 6.1 | 1.5 | 2.8 | — | <0.15 | 0.1 | 0.05 | — | — | 4 |
| R80 | 14 | 9.5 | 4 | 4 | — | 3 | — | — | 5 | ≤0.17 | — | — | — | — | 2 |
| US '840 | 10 | 21 | 1.2 | 5.4 | 6 | 5.5 | 1.5 | 3 | — | ≤0.16 | — | 0.015 | ≤1 | ≤0.2Y | |

[1] High-Temperature High-Strength Nickel Based Alloys, 1995 Supplement, No.393, NIDL Nickel Development Institute, 19 p.
[2] Matthew J. Donachine and Stephen J. Donachine, Superalloys, A Technical Guide, Second Edition, ASM International, 439 p.
[3] K. Harris, G.L. Erickson, and R.E. Schwer, Directionally Solidified and Single-Crystal Superalloys, Specialty Steels and Heat-Resistant Alloys, pp. 995-1006.
[4] Earl W. Ross and Kevin S. O'Hara, Rene 142: A High Strength, Oxidation Resistant DS Turbine Airfoil Alloy, Superalloys 1992, pp. 257-265.
All above references are incorporated herein by reference.

In view of the above, there are substantial needs in the development of a new high strength and ductility nickel based welding material that can produce crack free welds on the single crystal (SX) materials at an ambient temperature for repair of turbine engine components. In one aspect, there is a need in the art for a nickel based welding material that can be used for welding of a base material containing more than 6 wt. % of tantalum (Ta). In another aspect, there is a need in the art for a nickel based welding material that can be used for welding of a base material containing less than 6 wt. % of tantalum (Ta).

SUMMARY OF THE INVENTION

In one aspect, the specification relates to a high gamma prime (γ') nickel based welding material (Alloy A) containing (by wt. %): from 13.0 to 14.0% Cr, from 30.0 to 32.0% Co, from 0.7 to 0.9% Mo, from 7.0 to 8.0% W, from 2.0 to 5.0% Ta, from 3.8 to 5.5% Al, from 0 to 0.12% Ti, from 0 to 0.02% Zr, from 0 to 0.8% Hf, from 0 to 0.02% B, from 0.17 to 0.25% C, from 0.005 to 0.015% Y, from 0 to 0.01% V, from 1.0 to 2.0% Re, and nickel and impurities to balance. It was determined that welding material produced sound high strength welds on single crystal materials with high tantalum content by manual gas tungsten arc welding (GTAW-MA) at ambient temperature.

In another aspect, the specification relates to a high gamma prime (γ') nickel based welding material (Alloy B), having a low carbon content, the welding material containing (by wt. %): from 13.0 to 14.0% Cr, from 30.0 to 32.0% Co, from 0.7 to 0.9% Mo, from 7.0 to 8.0% W, from 0.5 to 1.9% Ta, from 3.8 to 5.5% Al, from 0 to 0.12% Ti, from 0.005 to 0.02% Zr, from 0.4 to 0.8% Hf, from 0 to 0.02% B, from 0.05 to 0.16% C, from 0 to 0.015% Y, from 0 to 0.01% V, from 1.0 to 2.0% Re, and nickel and impurities to balance. It was determined that the welding material produced sound high strength welds on various tantalum free superalloys (or those containing low amount of Ta) and single crystal materials. Also, Alloy B produced sound 3D additive manufacturing (AM) materials and as such can be used for manufacturing of various articles, where in due to specific service conditions materials should demonstrate high ductility at ambient and high temperature.

In another aspect, the specification relates to a high gamma prime (γ') nickel based welding material (Alloy F) containing (by wt. %): from 13.0 to 14.0% Cr, from 30.0 to 32.0% Co, from 0.7 to 0.9% Mo, from 7.0 to 8.0% W, from 3.0 to 6.0% Ta, from 3.8 to 4.5% Al, from 0 to 0.12% Ti, from 0 to 0.02% Zr, from 0.4 to 0.8% Hf, from 0 to 0.02% B, from 0.2 to 0.3% C, from 0 to 0.015% Y, from 0 to 0.01% V, from 1.0 to 2.0% Re, and nickel and impurities to balance. It was determined that the welding material produced sound high strength and high hardness welds on various superalloys, which made this material most suitable for a repair of turbine engine components that exhibit combination of wear, high stresses, and high temperature oxidation in service conditions.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

STANDARD ACRONYMS AND COMMON DESCRIPTIONS OF TERMS

Figure 1:
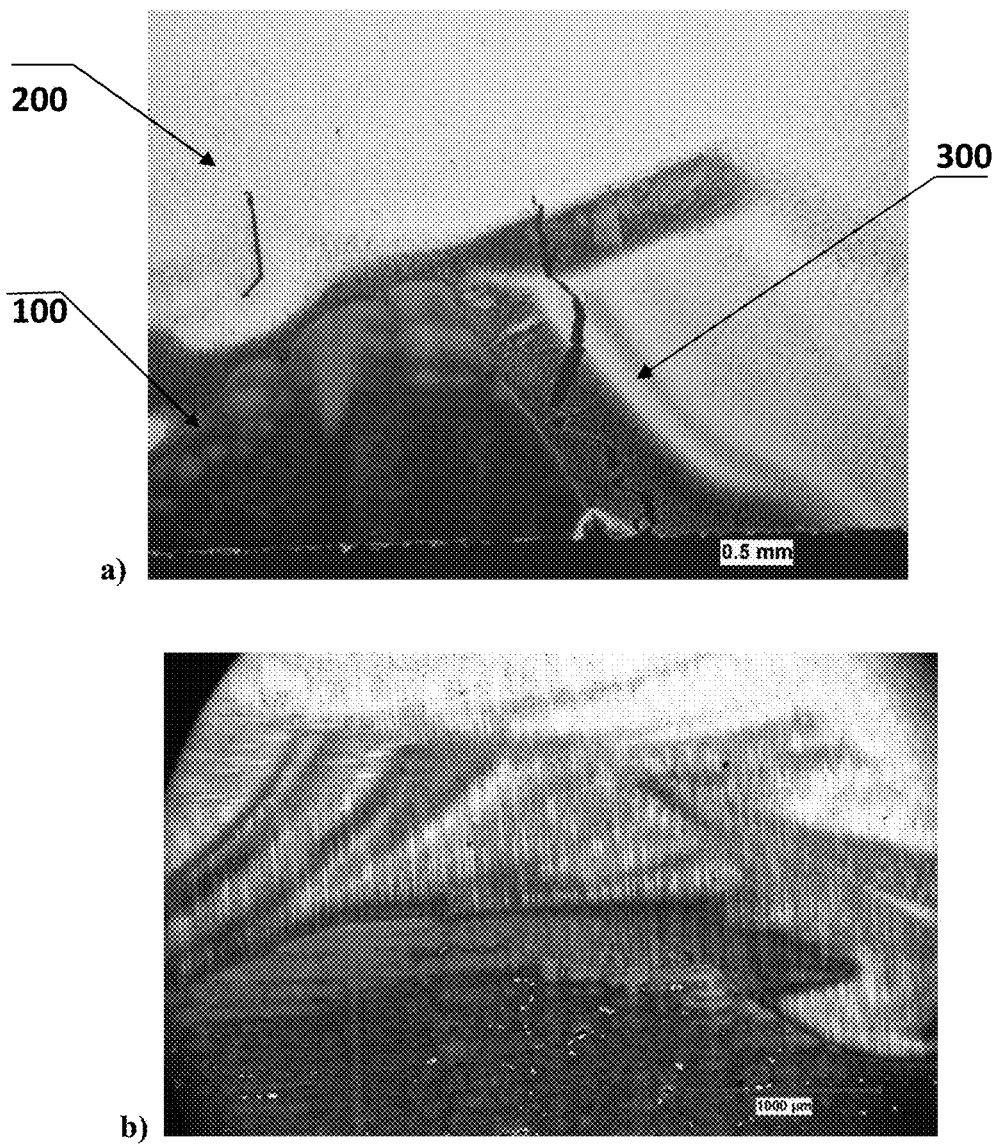
FIG. 1 shows a typical microstructure of the weld buildup adjacent to the PWA1484 single crystal base material by the GTAW-MA at ambient temperature using (a) a commercially available nickel based welding material (rods), where: 100—Base Material, 200—Weld, 3—Diluted Area; (b) welding rods manufactured from welding material Alloy A (as disclosed herein)

ASTM—American Society for Testing and Materials (standards)
HPT—High Pressure Turbine
LPT—Low Pressure Turbine
NDT—Non Destructive Testing
NGV—Nozzle Gide Vane
UTS—Ultimate Tensile Strength
LBW—Laser Beam Welding
MPW—Micro-Plasma Welding
GTAW—Gas Tungsten Arc Welding
EBW—Electron Beam Welding
PAW—Plasma Arc Welding
SX—Single Crystal Material
BM—Base Material
3D AM—Three Dimensional Additive Manufacturing
SEM—Scan Electron Microscope
EDS—Energy-Dispersive X-ray Spectroscopy Nickel Based Superalloys—are metallic materials that are used for a manufacturing of turbine engine components and other articles that exhibit excellent mechanical strength and resistance to creep (tendency of solid materials to slowly move or deform under stress) at high temperatures, up to 0.9 melting temperature; good surface stability, oxidation and corrosion resistance. Precipitation strengthening superalloys typically have a matrix with an austenitic face-centered cubic crystal lattice with precipitation of nickel-aluminum or titanium-aluminum based γ' phase. Superalloys are used mostly for manufacturing of turbine engine components.

Weldability—ability of a material to be welded under imposed conditions into a specific, suitable structure and to perform satisfactorily for its intended use.

Structural Turbine Engine Components—various cases, frames, nozzle guide vane rings and other stator parts that ensure engine integrity in service conditions.

Base Material—is the material of the engine components and test samples.

Energy-dispersive X-ray spectroscopy (EDS)—is an analytical technique used for the elemental analysis or chemical characterization of a sample.

DESCRIPTION OF EXAMPLE EMBODIMENTS

In one aspect, the specification relates to a high gamma prime (γ') nickel based welding material (Alloy A), comprising by wt. %:
Chromium from 13.0 to 14.0%,
Cobalt from 30.0 to 32.0%,
Molybdenum from 0.7 to 0.9%,
Tungsten from 7.0 to 8.0%,
Tantalum from 2.0 to 5.0%,
Aluminum from 3.8 to 5.5%,
Titanium from 0 to 0.12%,
Zirconium from 0 to 0.02%,
Hafnium from 0.4 to 0.8%, Boron from 0 to 0.02%,
Carbon from 0.17 to 0.25%,
Yttrium from 0.005 to 0.015%,
Vanadium from 0 to 0.01%,
Rhenium from 1.0 to 2.0%, and
Nickel and impurities to balance.

In another aspect, the specification relates to a high gamma prime (γ') nickel based welding material (Alloy B), comprising by wt. %:
Chromium from 13.0 to 14.0%,
Cobalt from 30.0 to 32.0%,
Molybdenum from 0.7 to 0.9%,
Tungsten from 7.0 to 8.0%,
Tantalum from 0.5 to 1.9%,
Aluminum from 3.8 to 5.5%,
Titanium from 0 to 0.12%,
Zirconium from 0.005 to 0.02%,
Hafnium from 0.4 to 0.8%,
Boron from 0 to 0.02%,
Carbon from 0.05 to 0.16%,
Yttrium from 0 to 0.015%,
Vanadium from 0 to 0.01%,
Rhenium from 1.0 to 2.0%, and
Nickel and impurities to balance.

In a third aspect, the specification relates to a high gamma prime (γ') nickel based welding material (Alloy F), comprising by wt. %:
Chromium from 13.0 to 14.0%,
Cobalt from 30.0 to 32.0%,
Molybdenum from 0.7 to 0.9%,
Tungsten from 7.0 to 8.0%,
Tantalum from 3.0 to 6.0%,
Aluminum from 3.8 to 4.5%,
Titanium from 0 to 0.12%,
Zirconium from 0 to 0.02%,
Hafnium from 0.4 to 0.8%,
Boron from 0 to 0.02%,
Carbon from 0.2 to 0.3%,
Yttrium from 0 to 0.015%,
Vanadium from 0 to 0.01%,
Rhenium from 1.0 to 2.0%, and
Nickel to balance.

In one embodiment, chromium (Cr) is present in any one of Alloys A, B or F in a range from 13.0 to 14.0 wt. %, and all values in between. In a particular embodiment, for example and without limitation, the high gamma prime (γ') nickel based welding material can contain chromium at 13.0 wt. %, 13.1 wt. %, 13.2 wt. %, 13.3 wt. %, 13.4 wt. %, 13.5 wt. %, 13.6 wt. %, 13.7 wt. %, 13.8 wt. %, 13.9 wt. % or 14.0 wt. %, and all values in between and/or all combination of ranges based on the values noted herein.

In one embodiment, cobalt (Co) is present in Alloy A, B or F in a range from 30.0 to 32.0 wt. %, and all values in between. In a particular embodiment, for example and without limitation, the high gamma prime (γ') nickel based welding material of Alloy A or F can contain cobalt at 30.0 wt. %, 30.1 wt. %, 30.2 wt. %, 30.3 wt. %, 30.4 wt. %, 30.5 wt. %, 30.6 wt. %, 30.7 wt. %, 30.8 wt. %, 30.9 wt. %, 31.0 wt. %, 31.1 wt. %, 31.2 wt. %, 31.3 wt. %, 31.4 wt. %, 31.5 wt. %, 31.6 wt. %, 31.7 wt. %, 31.8 wt. %, 31.9. wt. % or 32.0 wt. %, and all values in between and/or all combination of ranges based on the values noted herein.

In one embodiment, molybdenum (Mo) is present in any one of Alloys A, B or F in a range from 0.7 to 0.9 wt. %, and all values in between. In a particular embodiment, for example and without limitation, the high gamma prime (γ') nickel based welding material of any one of Alloys A, B or F can contain molybdenum at 0.7 wt. %, 0.75 wt. %, 0.80 wt. %, 0.85 wt. % or 0.9 wt. %, and all values in between and/or all combination of ranges based on the values noted herein.

In one embodiment, tungsten (W) is present in any one of Alloys A, B or F in a range from 7.0 to 8.0 wt. %, and all values in between. In a particular embodiment, for example and without limitation, the high gamma prime (γ') nickel based welding material of any one of Alloys A, B or F can contain tungsten at 7.0 wt. %, 7.1 wt. %, 7.2 wt. %, 7.3 wt. %, 7.4 wt. %, 7.5 wt. %, 7.6 wt. %, 7.7 wt. %, 7.8 wt. %, 7.9 wt. %, or 8.0 wt. %, and all values in between and/or all combination of ranges based on the values noted herein.

In one embodiment, tantalum (Ta) is present in Alloy A in a range from 2.0 to 5.0 wt. %, and all values in between. In a particular embodiment, for example and without limitation, the high gamma prime (γ') nickel based welding material Alloy A can contain tantalum at 2.0 wt. %, 2.1 wt. %, 2.2 wt. %, 2.3 wt. %, 2.4 wt. %, 2.5 wt. %, 2.6 wt. %, 2.7 wt. %, 2.8 wt. %, 2.9 wt. %, 3.0 wt. %, 3.1 wt. %, 3.2 wt. %, 3.3 wt. %, 3.4 wt. %, 3.5 wt. %, 3.6 wt. %, 3.7 wt. %, 3.8 wt. %, 3.9 wt. %, 4.0 wt. %, 4.1 wt. %, 4.2 wt. %, 4.3 wt. %, 4.4 wt. %, 4.5 wt. %, 4.6 wt. %, 4.7 wt. %, 4.8 wt. %, 4.9 wt. % or 5.0 wt. %, and all values in between and/or all combination of ranges based on the values noted herein.

In one embodiment, tantalum (Ta) is present in Alloy B in a range from 0.5 to 1.9 wt. %, and all values in between. In a particular embodiment, for example and without limitation, the high gamma prime (γ') nickel based welding material of Alloy B can contain tantalum at 0.5 wt. %, 0.6 wt. %, 0.7 wt. %, 0.8 wt. %, 0.9 wt. %, 1.0 wt. %, 1.1 wt. %, 1.2 wt. %, 1.3 wt. %, 1.4 wt. %, 1.5 wt. %, 1.6 wt. %, 1.7 wt. %, 1.8 wt. % or 1.9 wt. %, and all values in between and/or all combination of ranges based on the values noted herein.

In one embodiment, tantalum (Ta) is present in Alloy F in a range from 3.0 to 6.0 wt. %, and all values in between. In a particular embodiment, for example and without limitation, the high gamma prime (γ') nickel based welding material of Alloy F can contain tantalum at 3.0 wt. %, 3.1 wt. %, 3.2 wt. %, 3.3 wt. %, 3.4 wt. %, 3.5 wt. %, 3.6 wt. %, 3.7 wt. %, 3.8 wt. %, 3.9 wt. %, 4.0 wt. %, 4.1 wt. %, 4.2 wt. %, 4.3 wt. %, 4.4 wt. %, 4.5 wt. %, 4.6 wt. %, 4.7 wt. %, 4.8 wt. %, 4.9 wt. %, 5.0 wt. %, 5.1 wt. %, 5.2 wt. %, 5.3 wt. %, 5.4 wt. %, 5.5 wt. %, 5.6 wt. %, 5.7 wt. %, 5.8 wt. %, 5.9 wt. %, or 6.0 wt. %, and all values in between and/or all combination of ranges based on the values noted herein.

In one embodiment, aluminum (Al) is present in Alloy A or B in a range from 3.8 to 5.5 wt. %, and all values in between. In another embodiment, aluminum (Al) is present in Alloy A or B in a range from 4.8 to 5.5 wt. %, and all values in between. In a particular embodiment, for example and without limitation, the high gamma prime (γ') nickel based welding material of Alloy A or B can contain aluminum at 3.8 wt. %, 3.9 wt. %, 4.0 wt. %, 4.1 wt. %, 4.2 wt. %, 4.3 wt. %, 4.4 wt. %, 4.5 wt. %, 4.6 wt. %, 4.7 wt. %, 4.8 wt. %, 4.9 wt. %, 5.0 wt. %, 5.1 wt. %, 5.2 wt. %, 5.3 wt. %, 5.4 wt. % or 5.5 wt. %, and all values in between and/or all combination of ranges based on the values noted herein.

In one embodiment, aluminum (Al) is present in Alloy F in a range from 3.8 to 4.5 wt. %, and all values in between. In a particular embodiment, for example and without limitation, the high gamma prime (γ') nickel based welding material of Alloy F can contain aluminum at 3.8 wt. %, 3.9 wt. %, 4.0 wt. %, 4.1 wt. %, 4.2 wt. %, 4.3 wt. %, 4.4 wt. %, or 4.5 wt. %, and all values in between and/or all combination of ranges based on the values noted herein.

In one embodiment, titanium (Ti) is present in any one of Alloys A, B or F in a range from 0 to 0.12 wt. %, and all values in between. In another embodiment, titanium (Ti) is present in Alloy A in a range from 0.005 to 0.12 wt. %, and all values in between. In a particular embodiment, for example and without limitation, the high gamma prime (γ') nickel based welding material of any one of Alloys A, B or F can contain titanium at 0.005 wt. %, 0.010 wt. %, 0.015 wt. %, 0.020 wt. %, 0.025 wt. %, 0.030 wt. %, 0.035 wt. %, 0.040 wt. %, 0.045 wt. %, 0.050 wt. %, 0.055 wt. %, 0.060 wt. %, 0.065 wt. %, 0.070 wt. %, 0.075 wt. %, 0.080 wt. %, 0.085 wt. %, 0.090 wt. %, 0.095 wt. %, 0.100 wt. %, 0.105 wt. %, 0.110 wt. %, 0.115 wt. %, or 0.12 wt. %, and all values in between and/or all combination of ranges based on the values noted herein.

In one embodiment, zirconium (Zr) is present in Alloy A or F in a range from 0 to 0.02 wt. %, and all values in between. In another embodiment, zirconium (Zr) is present in Alloy A in a range from 0.005 to 0.02 wt. %, and all values in between. In a particular embodiment, for example and without limitation, the high gamma prime (γ') nickel based welding material of Alloy A or F can contain zirconium at 0 wt. %, 0.005 wt. %, 0.010 wt. %, 0.015 wt. % or 0.02 wt. %, and all values in between and/or all combination of ranges based on the values noted herein.

In one embodiment, zirconium (Zr) is present in Alloy B in a range from 0.005 to 0.02 wt. %, and all values in between. In a particular embodiment, for example and without limitation, the high gamma prime (γ') nickel based welding material of Alloy B can contain zirconium at 0.005 wt. %, 0.010 wt. %, 0.015 wt. % or 0.02 wt. %, and all values in between and/or all combination of ranges based on the values noted herein.

In one embodiment, hafnium (Hf) is present in any one of Alloys A, B or F in a range from 0.4 to 0.8 wt. %, and all values in between. In a particular embodiment, for example and without limitation, the high gamma prime (γ') nickel based welding material of any one of Alloys A, B or F can contain hafnium at 0.4 wt. %, 0.45 wt. %, 0.50 wt. %, 0.55 wt. %, 0.60 wt. %, 0.65 wt. %, 0.70 wt. %, 0.75 wt. %, or 0.80 wt. %, and all values in between and/or all combination of ranges based on the values noted herein.

In one embodiment, boron (B) is present in any one of Alloys A, B or F in a range from 0 to 0.02 wt. %, and all values in between. In a particular embodiment, for example and without limitation, the high gamma prime (γ') nickel based welding material of any one of Alloys A, B or F can contain boron at 0 wt. %, 0.005 wt. %, 0.010 wt. %, 0.015 wt. % or 0.02 wt. %, and all values in between and/or all combination of ranges based on the values noted herein.

In one embodiment, carbon (C) is present in Alloy A in a range from 0.17 to 0.25 wt. %, and all values in between. In a particular embodiment, for example and without limitation, the high gamma prime (γ') nickel based welding material of Alloy A can contain carbon at 0.17 wt. %, 0.18 wt. %, 0.19 wt. %, 0.20 wt. %, 0.21 wt. %, 0.22 wt. %, 0.23 wt. %, 0.24 wt. % or 0.25 wt. %, and all values in between and/or all combination of ranges based on the values noted herein.

In one embodiment, carbon (C) is present in Alloy B in a range from 0.05 to 0.16 wt. %, and all values in between. In a particular embodiment, for example and without limitation, the high gamma prime (γ') nickel based welding material of Alloy A can contain carbon at 0.05 wt. %, 0.06 wt. %, 0.07 wt. %, 0.08 wt. %, 0.09 wt. %, 0.10 wt. %, 0.11 wt. %, 0.12 wt. %, 0.13 wt. %, 0.14 wt. %, 0.15 wt. %, or 0.16 wt. %, and all values in between and/or all combination of ranges based on the values noted herein.

In one embodiment, carbon (C) is present in Alloy F in a range from 0.2 to 0.3 wt. %, and all values in between. In a particular embodiment, for example and without limitation, the high gamma prime (γ') nickel based welding material of Alloy A can contain carbon at 0.2 wt. %, 0.21 wt. %, 0.22 wt. %, 0.23 wt. %, 0.24 wt. %, 0.25 wt. %, 0.26 wt. %, 0.27 wt. %, 0.28 wt. %, 0.29 wt. %, or 0.3 wt. %, and all values in between and/or all combination of ranges based on the values noted herein.

In one embodiment, yttrium (Y) is present in Alloy A in a range from 0.005 to 0.015 wt. %, and all values in between. In a particular embodiment, for example and without limitation, the high gamma prime (γ') nickel based welding material of Alloy A can contain yttrium at 0.005 wt. %, 0.010 wt. %, or 0.015 wt. %, and all values in between and/or all combination of ranges based on the values noted herein.

In one embodiment, yttrium (Y) is present in Alloys B or F in a range from 0 to 0.015 wt. %, and all values in between. In a particular embodiment, for example and without limitation, the high gamma prime (γ') nickel based welding material of Alloy B or F can contain yttrium at 0 wt. %, 0.005 wt. %, 0.010 wt. %, or 0.015 wt. %, and all values in between and/or all combination of ranges based on the values noted herein.

In one embodiment, vanadium (V) is present in any one of Alloys A, B or F in a range from 0 to 0.01 wt. %, and all values in between. In a particular embodiment, for example and without limitation, the high gamma prime (γ') nickel based welding material of any one of Alloys A, B or F can contain boron at 0 wt. %, 0.005 wt. %, or 0.01 wt. %, and all values in between and/or all combination of ranges based on the values noted herein.

In one embodiment, rhenium (Re) is present in any one of Alloys A, B or F in a range from 1.0 to 2.0 wt. %, and all values in between. In a particular embodiment, for example and without limitation, the high gamma prime (γ') nickel based welding material of any one of Alloys A, B or F can contain rhenium at 1.0 wt. %, 1.1 wt. %, 1.2 wt. %, 1.3 wt. %, 1.4 wt. %, 1.5 wt. %, 1.6 wt. %, 1.7 wt. %, 1.8 wt. %, 1.9 wt. %, or 2.0 wt. %, and all values in between and/or all combination of ranges based on the values noted herein.

In addition to the elements noted herein, the Alloys A, B or F contains nickel (Ni) and impurities to balance. The one or more impurities present in any one of alloys A, B or F are not particularly limited, and can include impurities that are present in small or miniscule amounts that do not alter the properties of Alloys A, B or F, or affect the utility of Alloys A, B or F (particularly, the utility of Alloys A, B or F as a welding material). In a particular embodiment, for example and without limitation, the impurities are present below or at the detection limit of a detector. In another embodiment, for example and without limitation, the Alloys A, B or F contains the elements as noted above herein, and nickel to balance.

In one embodiment, for example and without limitation, the high gamma prime (γ') nickel based welding material of Alloy A can be used for welding of a base material containing >6 wt. % or ≥6 wt. % Ta. In one embodiment, the high gamma prime (γ') nickel based welding material of Alloy B can be used for welding of a base material containing <6 wt. % or ≤6 wt. % Ta. In one embodiment, the high gamma prime (γ') nickel based welding material of Alloy F can be used for hard facing applications of superalloys containing 0-10 wt. % Ta.

In view of the above, the specification relates to high gamma prime (γ') nickel based welding material (welding material), and is based on further development of the superalloy disclosed in U.S. Pat. No. 11,180,840. The welding material disclosed herein can be used for a repair of turbine engine components manufactured from tantalum bearing single crystal and other materials by manual gas tungsten arc welding (GTAW-MA) as well as for automatic laser beam (LBW), plasma (PAW), micro-plasma (MPW), electron beam (EBW) welding, and 3D additive manufacturing (AM).

The GTAW-MA has been used for a crack repair of various turbine engine components for decades. Unfortunately, cracking along the fusion line as shown in FIG. 1a due to poorly controlled weld penetration and dilution during manual welding, has been a major drawback of the GTAW-MA process. Therefore, improved high gamma prime welding materials were required to resolve cracking problem because neither chemical composition of turbine engine components nor weld dilution of GTAW-MA welds can be alternated and properly controlled by welders. Also, development of high gamma prime superalloys with good weldability can be valuable for the implementation of novel 3D AM process for manufacturing of turbine engine components.

Figure 2:
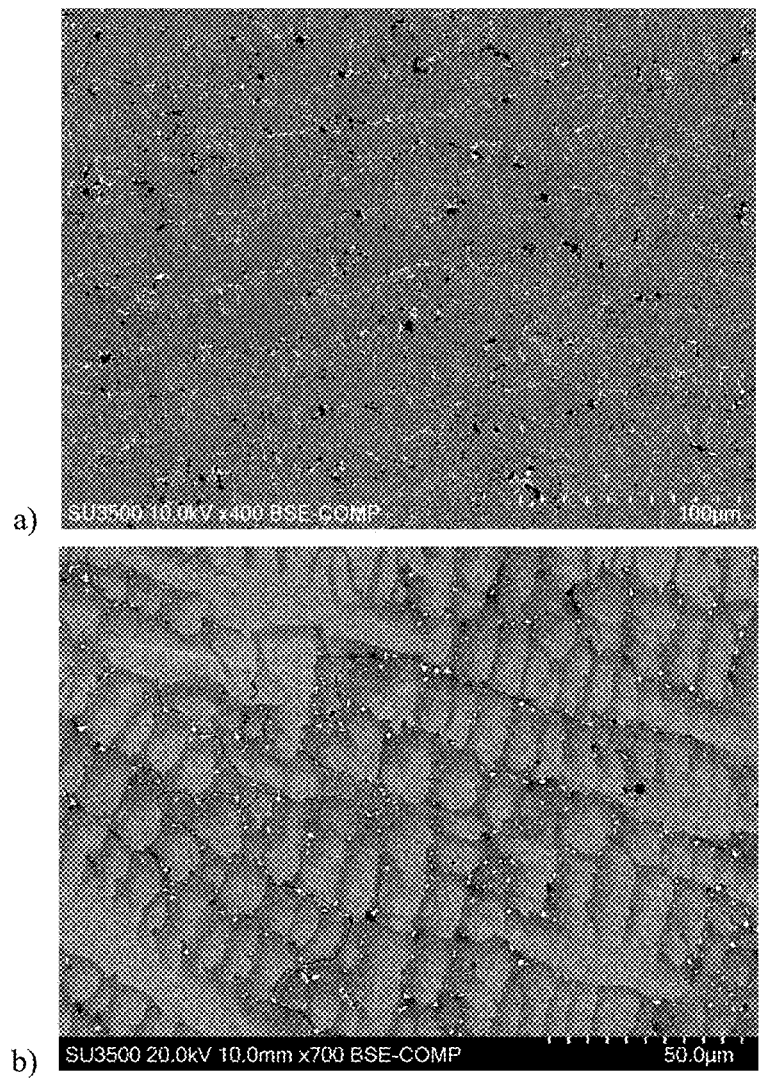
FIG. 2 shows a micrograph of the weld metal produced by the GTAW-MA at ambient temperature depicting microstructure and different amount of interdendritic eutectic in welds produced as disclosed herein using: (a) high carbon Alloy A; (b) low carbon Alloy B.
Figure 3:
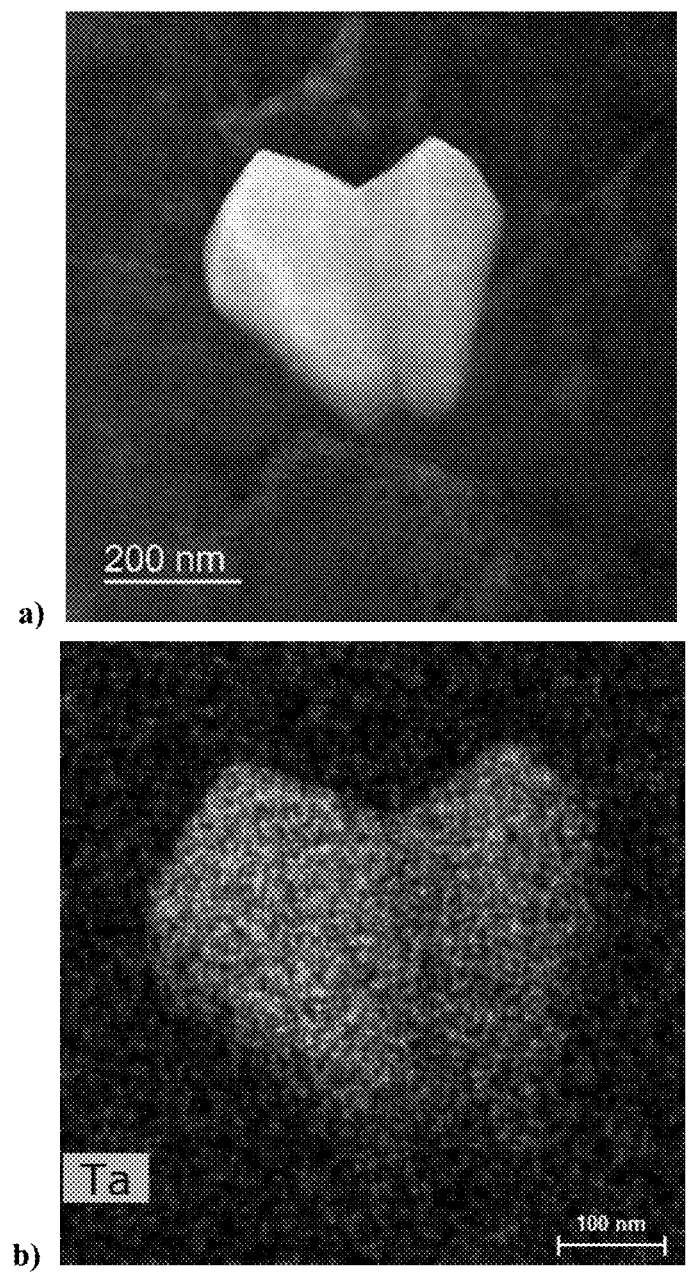
FIG. 3 shows an image of the tantalum based carbide in an Alloy B weld metal produced (a) using the high resolution Transmission Electron Microscopy (TEM), and (b) Energy-Dispersive X-ray Spectroscopy (EDS) of the same particle that depicts enrichment of carbides with tantalum.

In the course of the development of the welding materials disclosed herein, it was discovered that rather than reducing carbon content that is aimed at mitigating cracking following well-known trends, the carbon content in the nickel based welding material disclosed herein was increased, which in a combination with the optimization of other alloying elements, enhanced formation of refractory Ta based discrete carbides (as shown in FIG. 2a), reducing the amount of interdendritic Ta—Ni and Ta—Hf—Ni based low temperature eutectics as shown in FIG. 2b. The high resolution transmission electron microscopy (TEM) and energy-dispersive X-ray spectroscopy (EDS) confirmed formation of Ta based carbides as shown in FIG. 3.

For the characterization of the welding materials disclosed herein, the high carbon Alloys A, Alloy B as well as low carbon Alloys F were manufactured by casting followed by fabrication of welding rods using commercially available equipment and processes. The chemical compositions of the welding materials disclosed herein are provided in Table 2.

Samples manufactured from the welding materials and dissimilar welded joints comprising the single crystal base material and multilayer weld buildup produced by GTAW-MA were tested at ambient temperature (70° F.) as per American Society for Testing and Materials (ASTM) standard E-8. At temperature of 1700° F., 1800° F., and 1900° F. samples were subjected to tensile testing as per ASTM E-21 in air. In addition to above, the 'All Weld Metal' (AWM) samples manufactured from Alloys A and B were subjected to tensile testing for characterization of 3D AM materials. The Vickers Hardness Testing of hard facing welds produced using standard cobalt based PWA694 and discussed herein Alloy F was made at ambient temperature as per ASTM-E92 with loading of 300 grams.

The study of the microstructure revealed that the welding materials disclosed herein contained the Ni—Co—Cr—W—Re based gamma matrix, cuboidal primary and secondary gamma primary phases as well as discrete, mostly cuboidal, Ta based carbides. The fraction volume (vol. %) and size of gamma prime phase depended on chemical composition of welding materials and heat treatment parameters. For example, primary aging heat treatment of the Alloy A at 1975° F. for 4 hours followed by the secondary aging at 1300° F. for 24 hours resulted in a precipitation of 66.5 vol. % of the primary gamma prime and 2.25 vol. % of the secondary gamma prime phase with the size of 602±120 nm and 28±6 nm as shown in FIGS. 3a and 3b respectively. As such, the total amount of gamma prime phase was 68.5 vol. %.

It was found that Alloys A and B demonstrated sufficient properties for repair and 3D AM of turbine engine components (see Table 3). The selection of suitable welding material should be done based on service conditions and chemical composition of turbine engine components. The Alloy A was found to be most suitable for a repair of turbine engine components manufactured from single crystal materials with Ta content exceeding 6 wt. % that exposed to temperature max of 1800° F. The low carbon Alloy B was found to be most suitable for a repair of turbine engine components manufactured from single crystal materials with Ta content below of 6 wt. % by GTAW-MA and 3D AM components that due to service conditions should be manufactured from materials with high ductility at ambient and high temperature. However, due to high Co content, which

TABLE 2

Chemical Composition of the welding materials (Alloy A and B) in wt. %

| Mat. | Cr | Co | Mo | W | Ta | Al | Ti | Zr | Hf | Re | C | B | Y | V | Ni |
|---|---|---|---|---|---|---|---|---|---|---|---|---|---|---|---|
| Alloy A | 13.0 | 30.0 | 0.7 | 7.0 | 2.0 | 3.8 | 0 | 0 | 0.4 | 1.0 | 0.17 | 0 | 0.005 | 0 | Bal |
|  | 14.0 | 32.0 | 0.9 | 8.0 | 5.0 | 5.5 | 0.12 | 0.02 | 0.8 | 2.0 | 0.25 | 0.02 | 0.015 | 0.01 |  |
| Alloy B | 13.0 | 30.0 | 0.7 | 7.0 | 0.5 | 3.8 | 0 | 0.005 | 0.4 | 1.0 | 0.05 | 0 | 0 | 0 | Bal |
|  | 14.0 | 32.0 | 0.9 | 8.0 | 1.9 | 5.5 | 0.12 | 0.02 | 0.8 | 2.0 | 0.16 | 0.02 | 0.015 | 0.01 |  |
| Alloy F | 13.0 | 30.0 | 0.7 | 7.0 | 3.0 | 3.8 | 0 | 0 | 0.4 | 1.0 | 0.2 | 0 | 0 | 0 | Bal |
|  | 14.0 | 32.0 | 0.9 | 8.0 | 6.0 | 4.5 | 0.12 | 0.02 | 0.8 | 2.0 | 0.3 | 0.02 | 0.015 | 0.01 |  |

The values noted in the table above reflect the lower and upper limits of each element.

Figure 4:
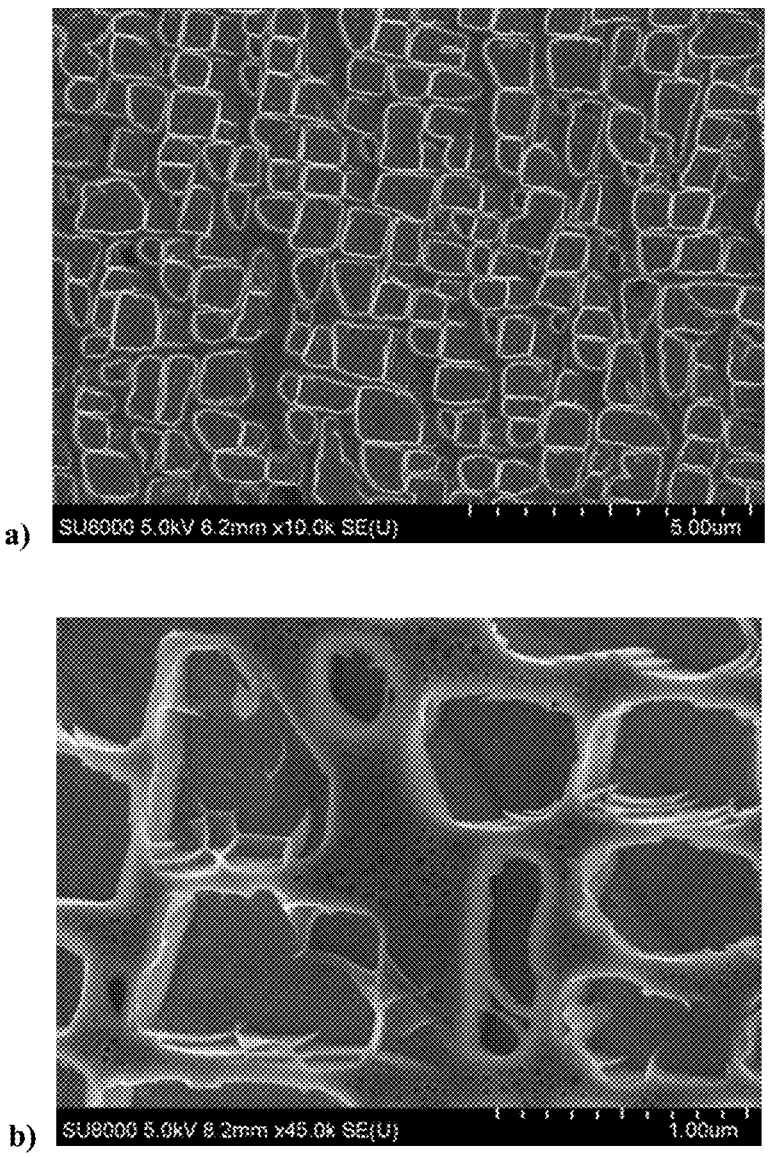
FIG. 4 shows micrographs of the weld metal produced using welding rods manufactured from Alloy A depicting (a) the primary gamma prime (γ') phase formed during aging at 1975° F. for 4 hours, and (b) the secondary gamma prime (γ') phase formed during aging at 1300° F. for 24 hours.

Structure of the welding materials disclosed herein and dissimilar welded joints were studied in the heat treat conditions using commercially available light and scan electron microscopy (SEM), high resolution transmission electron microscopy (TEM), and energy-dispersive X-ray spectroscopy (EDS). A typical microstructure of the welding materials disclosed herein is shown in FIG. 4 through FIG. 5.

reduces high temperature 0.2% yield strength, it appears that the service temperature of these components should not exceed 1800° F.

Figure 5:
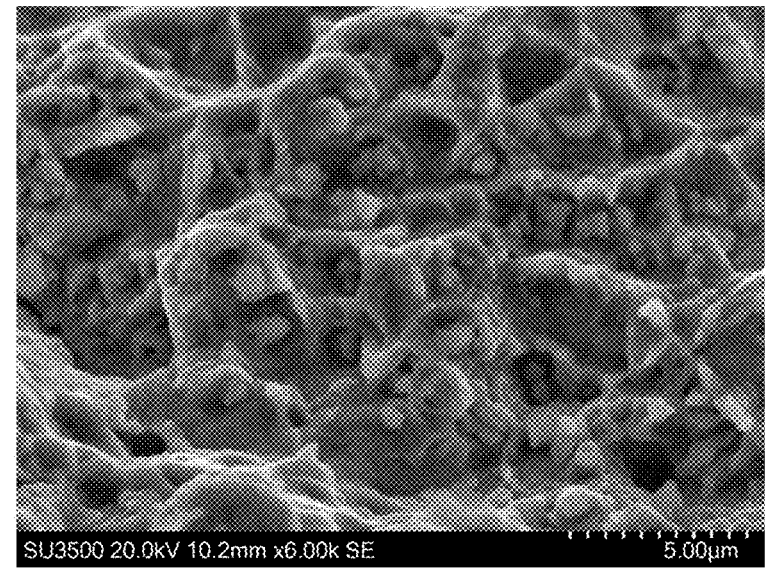
FIG. 5 shows fracture surfaces of the tensile sample manufactured from an Alloy A (as disclosed herein) weld produced using Scanning Electron Microscope SEM depicting (a) ductile dimple fracture of samples with cuboidal precipitates, and (b) the same as (a) produced using the back-scattering technique to highlight the non-metallic nature of precipitates.
Figure 5:
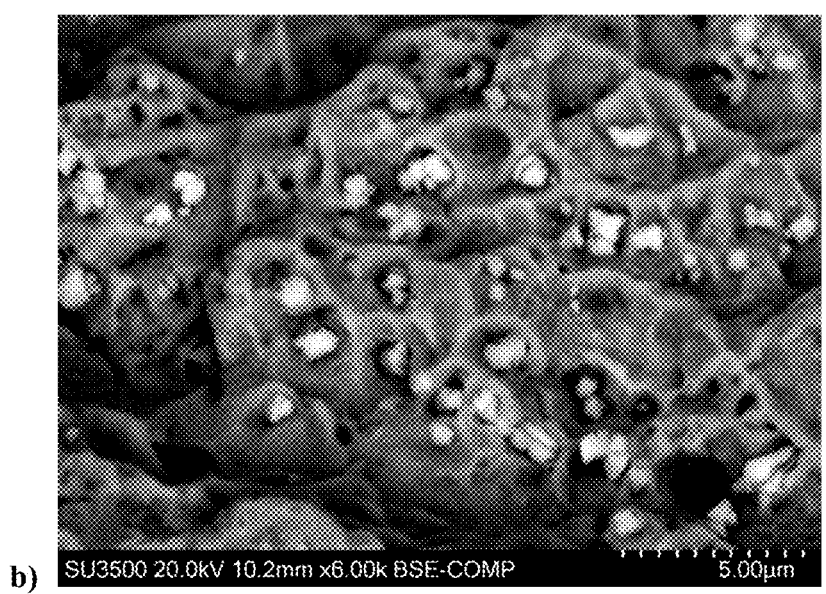
Figure 6:
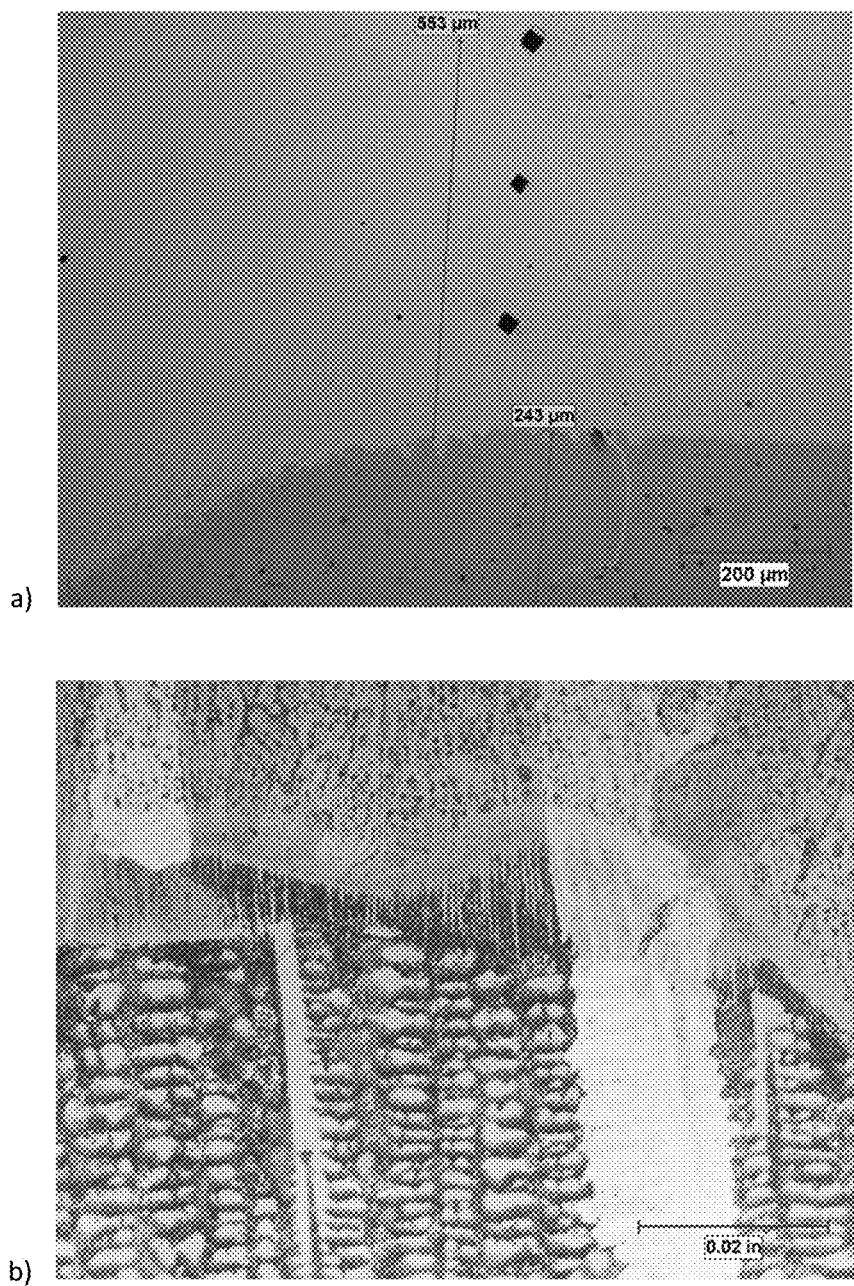
FIG. 6 shows the weld buildup produced using GTAW-MA and welding material manufactured from Alloy F on: (a) Rene 80, and (b) Directionally solidified superalloy Mar M002.

Analysis of the fracture of the tensile samples revealed fracture surfaces had, as typical for ductile materials, dimple fracture with discrete high strength carbides imbedded into the ductile matrix as shown in FIG. 5. Therefore, unique combination of high strength and ductility was indeed attributed to precipitation of cuboidal Ni—Al based gamma prime phase and Ta based carbides in the ductile Ni—Co—Cr—Re—Mo—W based matrix. Good weldability of the materials disclosed herein was attributed to the high ductility of Alloy A, B, and F that enabled accommodation of thermal stresses by plastic deformation and optimized amount of eutectics that were formed during solidification of a welding pool by optimization of amount of carbon in the conjunction with other alloying elements and dilution of welds due to metallurgical interaction with materials of turbine engine components.

TABLE 3

Mechanical Properties of Cast Materials after Aging Heat Treatment

| Material | Test Temp. °F. | UTS, KSI | 0.2% Yield Strength, KSI | Elong. % |
|---|---|---|---|---|
| Alloy A | 70 | 154.8 | 123.1 | 8.7 |
|  | 1700 | 70.1 | 53.9 | 28.2 |
|  | 1900 | 23.0 | 15.7 | 51.0 |
| Alloy B | 70 | 148.6 | 118.1 | 24.4 |
|  | 1700 | 63.1 | 49.4 | 29.3 |
|  | 1900 | 24.2 | 14.9 | 52.8 |

Example 1

To demonstrate the tip weld repair of high pressure turbine (HPT) blades manufactured from the single crystal PWA1484 base material, which comprises 8.7 wt. % Ta, the dissimilar weld samples were produced by GTAW-MA multi pass weld deposition using Alloy A welding material (rods) as per claim 1 onto the PWA1484 substrate material with the thickness of 0.35 inch at ambient temperature. Welding of samples and repair of the HPT blade was performed using the commercially available welding Miller Power Supplier for GTAW in argon. Welding current, welding speed, and welding rod feed rate were established by experiments following the standard practices based on the thickness of the base material and diameter of welding rods, refer to 'Guidelines For Gas Tungsten Arc Welding (GTAW)', 215994F from 2018-01, by Miller, which can be found in the Miller website following the link (https://www.millerwelds.com/-/media/inriver/guidelines-for-gas-tunsten-arc-welding-ataw.pdf) (incorporated herein by reference). Arc voltage was variable and depended from the ability of a welder to maintain the distance between the tungsten electrode and welding pool, which in a combination with the inconsistent welding speed and wire rods feed rate resulted in the irregular penetration and variable dilution shown in FIG. 1b. After welding, the test samples were subjected to the primary aging heat treatment at 1975° F. for 4 hours followed by the secondary aging heat treatment at 1300° F. for 24 hours as for PWA1484 base material. The dissimilar tensile samples (DWJ) comprising the equal in size and geometries parts of the PWA1484 base material and the Alloy A multi layers weld deposits with the joint line located at the center of the gage area. Only UTS and reduction of area (RA) were used for a characterization of the welded joint of the dissimilar tensile samples due to significate differences in strength and ductility of the high strength single crystal materials and polycrystalline weld metal. However, the 0.2% Yield Strength is still provided for reference.

Metallographic examination and non-destructive testing (NDT) of DWJ samples using a standard radiographic examination did not reveille cracks and other weld discontinuities despite inconsistency in weld penetration and significant dilution of the weld metal along the interface as shown in FIG. 1b.

Dissimilar welded joints demonstrated a slightly higher UTS than the Alloy A due to strengthening of the weld metal by PWA1484 metal during dilution as shown in Table 4.

TABLE 4

Tensile Properties of PWA1484-LW4272W Weld Samples

| Test Temp. °F. | UTS, KSI | 0.2% Yield Strength, KSI | Reducing Area % |
|---|---|---|---|
| 70 | 162.1 | 55.1 | 7.5 |
| 1700 | 74.3 | 53.8 | 42.2 |

The Alloy A welding material with high cobalt and carbon content was found most suitable for a radial crack repair adjacent to the low stress tip area of turbine blades manufactured from single crystal materials with high tantalum content such as PWA1484, PWA1480, CMSX-10. Due to high carbon and cobalt content, Alloy A was able to accommodate more tantalum and hafnium without cracking. However, cobalt reduced strength of Alloy A at 1900° F. as shown in Table 3. Therefore, the Alloy A was recommended mostly for a repair of turbine engine components exposed to temperature below of 1800° F.

Example 2

To demonstrate repair of turbine engine components manufactured from the Rene N5 single crystal material, which contains 4.8 wt. % Ta, the dissimilar weld samples were produced by GTAW-MA multi pass weld deposition using welding rods manufactured from Alloy B as per claim 2 onto the Rene N5 substrate at ambient temperature. Welding of samples was performed using the welding equipment, parameters, and techniques described in the Example 1. After welding test samples were subjected to the primary aging heat treatment at 1975° F. for 4 hours followed by the secondary aging heat treatment at 1650° F. for 4 hours as for the Rene N5 base material. The DWJ samples comprising the equal in size and geometries parts of the Rene N5 base material and the Alloy B multi layers weld buildup with the joint line located at the center of the gage area were manufactured as per ASTM E-8. Only UTS and reduction of area (RA) were used for a characterization of the dissimilar welded joints due to significate differences in strength and ductility of high strength of the Rene N5 single crystal material and polycrystalline weld metal. The 0.2% Yield Strength is provided for references only. As follows from Table 5, the dissimilar welding joints demonstrated mechanical properties similar to the properties of the Alloy B in aged condition.

TABLE 5

Tensile Properties of Rene N5 - Alloy B/Alloy C Welded Joints

| Welding Material | Test Temp. °F. | UTS, KSI | 0.2% Yield Strength, KSI | Reducing Area, % |
|---|---|---|---|---|
| Alloy B | 70 | 147.7 | 115.4 | 22.5 |
|  | 1800 | 50.1 | 32.7 | 19.8 |

Example 3

Despite high carbon content, Alloy A as well as low carbon Alloy B were found by experiments suitable for 3D AM. As follows from Table 6, tensile properties of "All Weld Metal" samples produced using high carbon Alloy A and low carbon Alloy B demonstrated good tensile strength at 70° F. and 1700° F. The selection of welding materials for 3D AM should be done based on the service conditions while selection of welding materials for a repair of turbine engine components should be made based on the service conditions and chemical composition of base materials of turbine engine components as it was discussed above.

TABLE 6

Tensile Properties of "All Weld Metal" (AWM) Test Samples

| Material | Test Temp. ° F. | UTS, KSI | 0.2% Yield Strength, KSI | Elongation, % |
| --- | --- | --- | --- | --- |
| AWM Alloy A | 70 | 178.6 | 151.4 | 8.3 |
|  | 1700 | 67.5 | 61.2 | 22.5 |
|  | 1900 | 25.6 | 18.2 | 54.3 |
| AWM Alloy B | 70 | 150.2 | 123.5 | 18.1 |
|  | 1700 | 65.5 | 51.1 | 27.5 |
|  | 1900 | 22.1 | 16.6 | 52.8 |

Example 4

Due to high cobalt and carbon content the welding materials disclosed herein can be used also for a repair of turbine engine components manufactured from equiaxed and directionally solidified tantalum free Rene 80, Inconel 713, Rene 77 as well as low tantalum commercially available Inconel 738, Mar M002, and other superalloys that exhibit combination of sever wear and high stresses in service conditions in lieu of the commercially available hard facing PWA694 cobalt based hard facing material.

PAW694 has good wear resistance but low tensile properties at high temperature as shown in Table 7. It was determined by experiments, welding rods manufactured from Alloy F produced sound welds on Rene 80 and Mar M002 directionally solidified material. The ultimate tensile strength (UTS) of welds produced using Alloy F at 1800° F. was 47.3 KSI while PWA694 welds demonstrated UTS just 29.8 KSI. The microhardness of Alloy F welds of 461 Hp at ambient temperature was superior to the microhardness of PWA694 welds of 349.5 Hp as shown in Table 7. Therefore, Alloy F can be used for a restoration of shrouds of low and high pressure turbine blades, tip of turbine blades that exhibit combination of rubbing, erosion, and high temperature oxidation, as well as various nozzle guide vanes (NGV).

TABLE 7

Tensile Properties of "All Weld Metal" (AWM) Test Samples at 1800° F.

| Weld Metal | UTS, KSI | 0.2% Yield Strength, KSI | Elongation, % |
| --- | --- | --- | --- |
| Alloy F | 47.3 | 35.5 | 33.1 |
| PWA694 | 29.8 | 20.0 | 32.1 |

It should be obvious that provided examples do not limit applications of the invented materials as well manufacturing of other embodiments for repair of turbine engine components and 3D AM with the claimed range of alloying elements.

All references noted herein are incorporated by reference. Certain adaptations and modifications of the described embodiments can be made. Therefore, the above discussed embodiments are considered to be illustrative and not restrictive.

What is claimed is:

1. A high gamma prime (γ') nickel based alloy comprising by wt. %:
   Chromium from 13.0 to 14.0%,
   Cobalt from 30.0 to 32.0%,
   Molybdenum from 0.7 to 0.9%,
   Tungsten from 7.0 to 8.0%,
   Tantalum from 2.0 to 5.0%,
   Aluminum from 3.8 to 5.5%,
   Titanium from 0 to 0.12%,
   Zirconium from 0 to 0.02%,
   Hafnium from 0.4 to 0.8%,
   Boron from 0 to 0.02%,
   Carbon from 0.17 to 0.25%,
   Yttrium from 0.005 to 0.015%,
   Vanadium from 0 to 0.01%,
   Rhenium from 1.0 to 2.0%, and
   Nickel and impurities to balance.

2. A turbine engine component manufactured at least in part by 3D additive manufacturing using the high gamma prime (γ') alloy as defined in claim 1.

3. A turbine engine component comprising the high gamma prime (γ') nickel based alloy as defined in claim 1.

4. An article comprising the high gamma prime (γ') nickel based alloy as defined in claim 1, wherein the product is selected from the group consisting of welding rod, welding wire, welding powder, 3D printing filament and 3D printing powder.

5. A turbine engine component manufactured from a superalloy containing 0-10 wt. % Ta and having a surface coated with the high gamma prime (γ') nickel based alloy as defined in claim 1.

6. A high gamma prime (γ') nickel based alloy comprising by wt. %:
   Chromium from 13.0 to 14.0%,
   Cobalt from 30.0 to 32.0%,
   Molybdenum from 0.7 to 0.9%,
   Tungsten from 7.0 to 8.0%,
   Tantalum from 0.5 to 1.9%,
   Aluminum from 3.8 to 5.5%,
   Titanium from 0 to 0.12%,
   Zirconium from 0.005 to 0.02%,
   Hafnium from 0.4 to 0.8%,
   Boron from 0 to 0.02%,
   Carbon from 0.05 to 0.16%,
   Yttrium from 0 to 0.015%,
   Vanadium from 0 to 0.01%,
   Rhenium from 1.0 to 2.0%, and
   Nickel and impurities to balance.

7. A turbine engine component manufactured at least in part by 3D additive manufacturing using the high gamma prime (γ') alloy as defined in claim 6.

8. A turbine engine component comprising the high gamma prime (γ') nickel based alloy as defined in claim 6.

9. An article comprising the high gamma prime (γ') nickel based alloy as defined in claim 6, wherein the product is selected from the group consisting of welding rod, welding wire, welding powder, 3D printing filament and 3D printing powder.

10. A turbine engine component manufactured from a superalloy containing 0-10 wt. % Ta and having a surface coated with the high gamma prime (γ') nickel based alloy as defined in claim 6.

11. A high gamma prime (γ') nickel based alloy comprising by wt. %:
Chromium from 13.0 to 14.0%,
Cobalt from 30.0 to 32.0%,
Molybdenum from 0.7 to 0.9%,
Tungsten from 7.0 to 8.0%,
Tantalum from 3.0 to 6.0%,
Aluminum from 3.8 to 4.5%,
Titanium from 0 to 0.12%,
Zirconium from 0 to 0.02%,
Hafnium from 0.4 to 0.8%,
Boron from 0 to 0.02%,
Carbon from 0.2 to 0.3%,
Yttrium from 0 to 0.015%,
Vanadium from 0 to 0.01%,
Rhenium from 1.0 to 2.0%, and
Nickel and impurities to balance.

12. A turbine engine component comprising the high gamma prime (γ') nickel based material as defined in claim 11.

13. A turbine engine component manufactured at least in part by 3D additive manufacturing using the high gamma prime (γ') alloy as defined in claim 11.

14. A turbine engine component comprising the high gamma prime (γ') nickel based alloy as defined in claim 11.

15. A product comprising the high gamma prime (γ') nickel based alloy as defined in claim 11, wherein the product is selected from the group consisting of welding rod, welding wire, welding powder, 3D printing filament and 3D printing powder.

16. A turbine engine component manufactured from a superalloy containing 0-10 wt. % Ta and having a surface coated with the high gamma prime (γ') nickel based alloy as defined in claim 11.

* * * * *